United States Patent [19]

Liggett

[11] 4,251,547

[45] Feb. 17, 1981

[54] FISH BAIT AND METHODS FOR ITS PREPARATION

[76] Inventor: James J. Liggett, 1235 Holly Dr., Twin Falls, Id. 83301

[21] Appl. No.: 48,070

[22] Filed: Jun. 13, 1979

[51] Int. Cl.$^3$ ............................................... A23K 1/00
[52] U.S. Cl. ...................................... 426/1; 426/276; 426/289; 426/335; 426/515; 426/516; 426/518; 426/641; 426/643; 426/658
[58] Field of Search ................... 426/1, 289, 512, 515, 426/516, 517, 518, 98, 89, 575, 641, 276, 271, 335, 643, 658; 119/1, 3

[56] References Cited

U.S. PATENT DOCUMENTS

| | | | |
|---|---|---|---|
| 3,437,488 | 4/1969 | Humphreys | 426/1 |
| 3,730,728 | 5/1973 | Patashnik et al. | 426/1 |
| 3,846,931 | 11/1974 | Block et al. | 426/1 |
| 3,875,302 | 4/1975 | Inoue | 426/1 |
| 3,903,304 | 9/1975 | Groninger et al. | 426/1 |
| 3,988,479 | 10/1976 | Stephan et al. | 426/1 |
| 4,119,739 | 10/1978 | Barwick | 426/575 |
| 4,144,353 | 3/1979 | Zaragoza | 426/1 |

OTHER PUBLICATIONS

The Merck Index, Published by Merck & Co. (1968), p. 214, Eighth Edition.

*Primary Examiner*—R. B. Penland
*Attorney, Agent, or Firm*—Edmond T. Patnaude

[57] ABSTRACT

A process in which a liquid sodium alginate solution is prepared, passed through openings in a perforated sheet to form droplets which are permitted to fall into a body of liquid calcium ion solution such as calcium chloride where reaction between the sodium alginate and calcium chloride produces calcium alginate in the form of a tough shell on the outside of the droplets, and filtering the coated particles from the calcium solution. The invention embraces other ways of introducing the sodium alginate solution into the calcium ion solution to produce various shapes of coated particles such as shrimp, worms, etc. Our invention includes also the products which are produced having the character, the form and the chemical content as described.

10 Claims, 4 Drawing Figures

U.S. Patent
Feb. 17, 1981
4,251,547
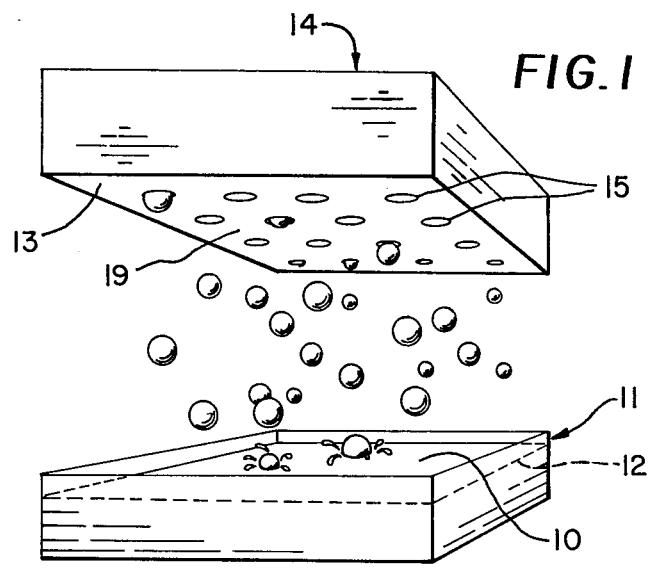
FIG. 1
FIG. 2
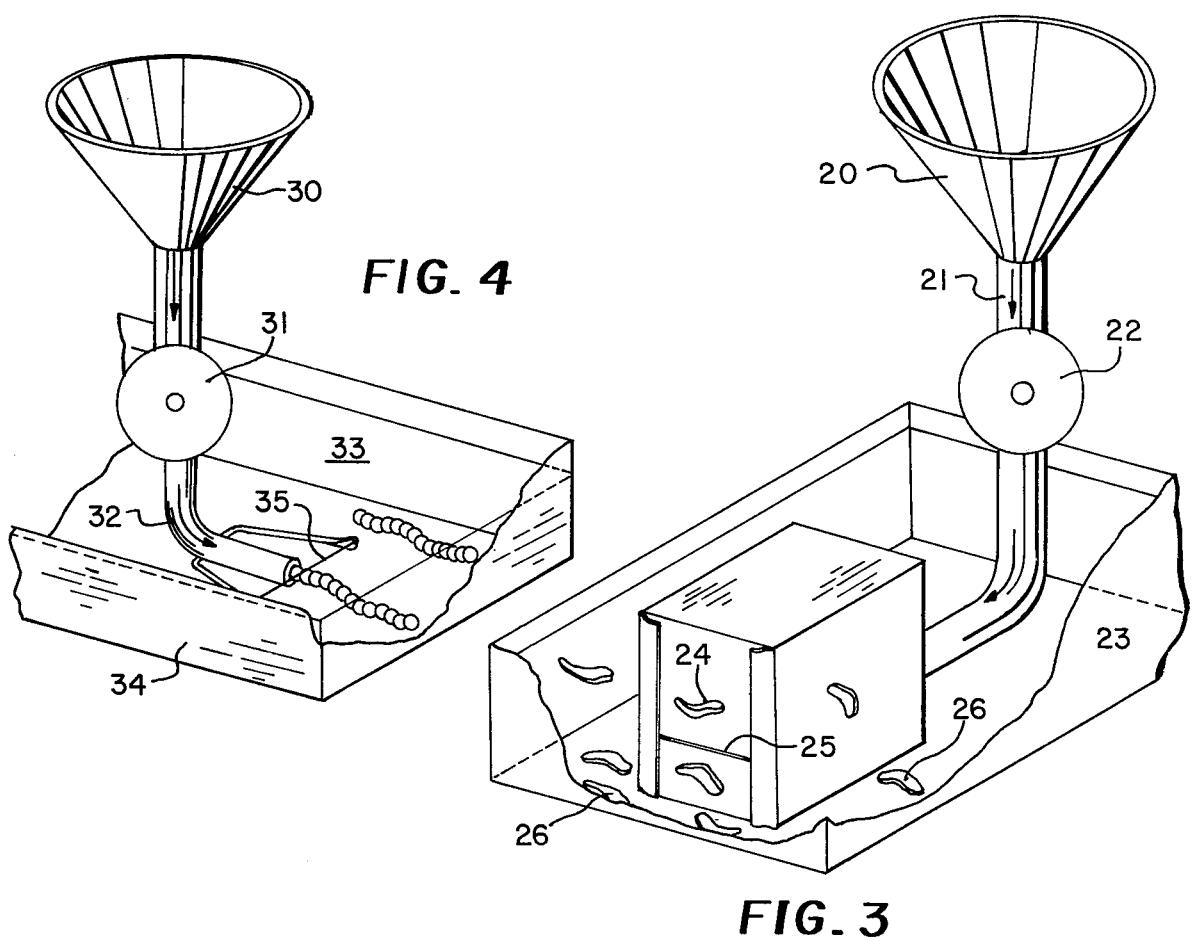
FIG. 4
FIG. 3

FISH BAIT AND METHODS FOR ITS PREPARATION

This invention relates to a fish bait and methods for preparing fish bait. More particularly, the invention deals with a method for preparing fish bait in forms which resemble the natural food of fish. The invention is also useful in the preparation of foods in special forms for human consumption.

BACKGROUND

Natural foods of fish include worms, shrimp, salmon eggs, bugs, flies, and many other bits of matter found in lakes, rivers and streams which are inhabited by fish. The fish are attracted by the forms and flavors of their natural foods. Accordingly, fishermen commonly use worms, shrimp, flies, etc. or some artificial bait which has some similarity to the natural food of the fish in order to catch the fish. Live worms, shrimp or the like may be grown especially for use as bait, but the culture of live bait has many hazards and very special conditions are required both in the culture and in the marketing of live bait.

We have, therefore, sought new methods for preparing bait using raw materials which are readily available and by which we may produce bait having the form, color and feel, and also the flavor of natural foods to which fish are attracted.

SUMMARY OF THE INVENTION

We have discovered that by introducing into a calcium ion solution a solution of sodium alginate in a prescribed manner, we may obtain particles which in form, texture, color and flavor, resemble very closely the natural foods to which fish are attracted. We find that by varying the manner in which the sodium alginate is introduced into the calcium ion solution, we may vary the size and shape of the particles and that by varying the concentration of the calcium ion solution we may vary the depth or the strength of the wall which is formed on the exterior of the particle.

DETAILED DISCLOSURE OF THE INVENTION

Certain embodiments of our invention are illustrated in the accompany drawing in which FIG. 1 is a schematic perspective view of apparatus useful in carrying out our improved process for the preparation of bait which similates salmon eggs;

FIG. 2 is an enlarged view of a cross-section showing a particle after there has been reaction with the calcium ion to form an exterior wall of calcium alginate about the particle;

FIG. 3 is a broken schematic perspective view of an appropriate apparatus useful in carrying out our process in the preparation of bait resembling shrimp, bacon rind, or the like; and FIG. 4 is a broken schematic view of apparatus useful in carrying out our process in the preparation of bait resembling worms of one or another kind.

The sodium alginate solution to which we have referred may be an aqueous solution containing sodium alginate in an amount of from about 0.5 to 25 percent by weight based on the weight of the solution; and the calcium ion solution to which we have referred may be an aqueous solution of a calcium salt, preferably calcium chloride, the calcium salt being contained in an amount of from about 0.5 to 25 percent by weight based on the weight of the calcium ion solution. Although we prefer to use calcium salt, such as calcium chloride, we may use any compound containing the calcium ion.

We may begin with the alginate solution containing one part of alginate in about 40 to 60 parts of water and with a calcium salt solution containing 1 part of calcium chloride in about 30 to 40 parts of water.

To the alginate solution we prefer to add a preservative such as sorbate, proprionate, or a paramino benzoate. We may add a coloring agent, with the particular coloring agent being dependent on a natural fish food being simulated. Also we may add a flavoring agent, depending on the kind of natural fish food being simulated. When desired, a fluorescent color may be incorporated in the alginate solution to provide a special attraction to fish.

FIG. 1 of the drawings illustrates equipment which may be used in preparing simulated salmon eggs for use as bait instead of natural salmon eggs. In this Figure, the calcium ion solution 10 is in a container 11, the level of the liquid being indicated by the line 12.

The sodium alginate solution 13 is placed in the container 14 which is above the container 11 and has a perforate bottom 19 providing openings 15 through which the liquid alginate solution may pass and form droplets. The bottom 19 may in fact be a screen of a mesh which produces droplets of the desired size; for example, to produce particles which simulate salmon eggs, we find that mesh sizes of from about $\frac{1}{8}$ inch to $\frac{3}{8}$ inches are quite satisfactory.

To operate the equipment of FIG. 1 the container 14 is placed at a distance above the container 11 and supported in this position in any suitable manner. Then the alginate solution may be poured into container 11. The alginate solution may contain preservatives, flavoring agents, coloring matter, etc. Preferably also we may add a thickener such as Locust bean gum for ease of processing. Suitably the thickener may be added in an amount of about 0.1 to 10 percent, based on the weight of the alginate solution.

The height between the screen bottom 19 and the level 12 of the calcium ion solution is subject to variation and may be from one inch or less to 5 feet. For best results, this distance may be from about 18 inches to 4 feet. We find it less desirable that this distance be more than about 5 feet due to difficulties of operation or due to flattening of the droplets upon impact with the liquid. The minimum distance through which the droplets fall to the surface of the calcium ion solution is preferably sufficient to allow the droplets, as they break from the openings in the screen 19 to assume a substantially spherical shape in their fall. In most cases this requires a distance of at least about 18 inches.

The reaction between the sodium alginate and the calcium compound starts immediately at the outside surface of the droplet upon contact, and a permanent shell 17 is formed about the droplet. The shell 17 is principally calcium alginate (see FIG. 2) which is stabilized by the preservatives which are added and is colored by the coloring agents which were added. Flavoring agents may also be added to the alginate, and it may be appreciated that each of these agents are dispersed in the shell material as well as on the interior of the shell.

At the beginning of the reaction between the sodium alginate and the calcium chloride, the droplet is suspended in the calcium solution, but as the reaction proceeds, the point is quickly reached at which the droplet precipitates to the bottom of the container, and from this point the coating of the particle continues to harden and becomes quite tough so that it is not easily ruptured. The particles may then be separated from the calcium solution by passing the solution through a filter or screen of smaller mesh than the mesh of the screen 14 which was used in the formation of the droplets.

When formed shapes are dried under moderate conditions, they will dry down at an even rate. As the dried shape is placed in water it will rehydrate and return to its original shape. The film and gel seemingly have a shape memory.

The separated particles may, if desired, be pressed together to connect their coatings before the coatings have hardened, to form agglomerations which can be handled, broken apart, and utilized as bait, similar to the manner in which natural fish eggs are used.

The process as above explained may also be used in the preparation of food stuffs such as simulated caviar and other foods for human consumption.

FIG. 3 illustrates another way to introduce the sodium alginate solution into the calcium ion solution to produce special shapes or particles. As here shown, the alginate solution is fed to a funnel 20 from which the solution is passed by tube 21 through a pump 22, and through a container 23 in which the calcium ion liquid is contained. The pump presses the alginate solution through a tube 21 through a pump 22, through a perforate container 23. The pump presses the alginate solution through a tube 21 and through openings 24 and severed to provide particles 26 in the calcium ion solution in container 23. The particles here illustrated are in the form of shrimps.

When the alginate solution contacts the calcium ion solution in container 23, the reaction to form the coating begins, and as the material issues from orifices 24, it may be cut as by passing a wire across the orifice to cut and separate the particles 26 in the form of shrimp.

FIG. 4 shows yet another method for introducing the sodium alginate solution into the calcium ion solution and for extruding the particles to simulate worms, such as earth worms or nightcrawlers. Here the sodium alginate solution is fed into the funnel 30 and passed through a pulsating pump 31, through tube 32 into the body of calcium ion solution 33 in container 34. The pulsations of pump 31 introduce successive enlargements in the cross-section of the extruded material leaves tube 32 and contacts the calcium ion solution, the same reaction takes place as previously explained to form a wall or coating about the exterior of the extruded material. A wirecutter 35 may be utilized to cut the extruded material into desired lengths simulating worms of one of another particular kind.

Using dies of different shapes and a pulsating pump or using a pump which is non-pulsating, various forms of particles resembling bacon, pork rind, minnows, bugs, etc., may be prepared. Usually the form of the desired particle will dictate the particular color or flavor which appropriately may be added to the sodium alginate solution.

Specific examples demonstrating the practice of our invention are given as follows.

Example 1—SALMON EGG SHAPE

The following ingredients are assembled in the amounts stated:
- 3 gms of sodium alginate
- 1.8 gram Locust bean gum (a thickener for ease of processing)
- 1.6 gram of selected salmon flavor
- Preservatives consisting of 0.5 grams methyl parasept, 0.5 gram propyl parasept, and 0.5 gram sodium benzoate
- 0.04 grams of yellow aluminum Lake #6

These ingredients were added to 454 grams of water andd thoroughly mixed. Then the solution was dropped through a sieve with 5/16th inch holes a distance of 4 feet above the calcium chloride solution to form spheres which resemble salmon eggs. 0.08 grams of aluminum Lake Red #40 color were added to the above for simulating red colored salmon eggs.

As flavoring agents we may add cheese, marshmallow, anise, and other attractant flavors.

Clusters of salmon eggs are formed by combining the salmon egg shapes when the exterior shells have been partially set to form the clusters. The simulated salmon eggs are separated from the remaining calcium chloride solution by filtration.

When spheres and other shapes were allowed to dry at room temperature for one week the size decreased considerably. The spheres which started out with a diameter of approximately 5/16 inch dried down to less than 1/32 inch in diameter. When the dehydrated shapes were placed in an excess of water they returned to their original size and shape with no apparant loss of shape, color or flavor.

Example 2—BAIT IN THE FORM OF SHRIMPS

The following ingredients were assembled in the amounts given:
- 5 grams of sodium alginate
- 2 grams of Locust bean gum
- 2 grams of Shrimp flavor
- 0.5 grams methyl parasept, 0.5 grams of propyl parasept, and 0.5 grams sodium benzoate were combined as the preservative
- 0.01 grams of yellow aluminum Lake #6 and 0.01 grams of aluminum Lake Red #40, as coloring agents.

The above ingredients were added to 454 grams of water and thoroughly mixed. The solution was then pumped through a die under the calcium ion solution and wirecut to depth.

When sphere shaped pieces (about 5/16 inch in diameter) produced as in Example 1 were placed in drying oven at 100° F. for two days, the shapes shrank in size to less than 1/32 inch in diameter. When the shapes were placed in an excess of water they returned or rehydrated to their original size. There was little if any apparant loss of size, shape, color, or odor.

When sphere shapes (5/16 inch) were placed in the drying oven at 250° F. for two hours they dehydrated down to about half of their original diameter and then appeared to be set or stable and not shrink any further. Upon placing these spheres in an excess of water they grew to their original size, but there were noticeable defects in the shape (i.e. dents) and an apparant loss of flavor, however, they were still functional.

When spheres were dried at 300° F. or higher, they shrank to about half size, but would not return to original size when placed in water and shapes were very irregular and had considerable loss of flavor and color.

Example 3—PREPARATION OF THE EARTHWORM OR NIGHTCRAWLER SHAPE

The following ingredients were assembled in the amounts given:

5 grams of sodium alginate
5 grams Locust bean gum
50 grams powdered earthworms
1 gram aluminum Lake Brown
0.5 grams of methyl parasept, and 0.5 grams propyl parasept, and 0.5 grams sodium benzoate as preservatives The above ingredients were added to 454 grams of water and then thoroughly mixed. The solution was then pumped by a pulsating pump through a round die (see FIG. 4) the alginate solution being passed under the level of the calcium ion solution to form the segmented worm shape illustrated In FIG. 4. The extruded material was then wirecut to lengths approximating 1 inch to 3 inches. Variations in this procedure involve the use of a nonpulsating pump to simulate a small eel for example. The percentage concentration of the calcium ion solution may be varied to produce walls of desired strength and elasticity of the coating.

While we have described in detail certain embodiments of the invention, it is to be understood that many embodiments of the invention may be carried out and many changes may be made all within the spirit of the invention and the scope of the following claims.

I claim:

1. A process for preparing fish bait comprising the steps producing a mixture of ingredients comprising a flavoring agent of natural foods to which fish are attracted and an aqueous solution of sodium alginate in an amount of from 0.5 to 25% by weight based on the weight of the sodium alginate solution, introducing said mixture in particulate form into an aqueous solution of a soluble calcium salt in an amount of from 0.5 to 25% by weight based on the weight of the calcium salt solution to produce particles having a resilient shell of solid calcium alginate, separating said particles from said aqueous solution of calcium salt, drying the separated particles at a temperature of less than 300° F. to facilitate their transportation and storage and subsequently rehydrating the dried particles.

2. A process as set forth in claim 1 including the steps of passing said mixture through openings in a perforated sheet above a body of said calcium solution whereby to form said mixture in the form of drops which are generally spherical shape, permitting said drops to fall into said calcium ion solution whereby a calcium alginate coating is formed on the exterior surface of the drops.

3. A process as set forth in claim 2 in which said openings are from 1 inch to 5 feet above said body of calcium solution.

4. A process as set forth in claim 1 in which said calcium solution is a calcium chloride solution.

5. A process as set forth in claim 1 in which said mixture is passed through a tube to a position below the level of said calcium salt solution and discharged from said tube directly into said calcium alginate solution.

6. A process as set forth in claim 5 including the step of applying pulsating pressure to said sodium alginate solution as it discharges from said tube.

7. A process as set forth in claim 5 including the step of passing a wire across the end of said tube to sever the discharged material to produce a desired length.

8. A process as set forth in claim 1 including the step of passing said mixture through an orifice located below the level of the calcium alginate solution, said orifice having a predetermined shape whereby said mixture passing through said orifice assumes in cross-section the form of the orifice.

9. A process as set forth in claim 8 which includes the step of severing said mixture after it has discharged from said orifice.

10. A process as set forth in claim 9 in which said orifice is in the shape of a shrimp.

* * * * *